United States Patent [19]

Barnes

[11] Patent Number: 4,676,250

[45] Date of Patent: Jun. 30, 1987

[54] METHOD AND APPARATUS FOR ESTIMATING THE ATTENUATION-VS-FREQUENCY SLOPE OF A PROPAGATION MEDIUM FROM THE COMPLEX ENVELOPE OF A SIGNAL

[75] Inventor: Casper W. Barnes, Newport Beach, Calif.

[73] Assignee: North American Philips Corporation, New York, N.Y.

[21] Appl. No.: 795,801

[22] Filed: Nov. 7, 1985

[51] Int. Cl.⁴ .......................................... G01N 29/00
[52] U.S. Cl. ..................................... 128/660; 73/602; 73/599
[58] Field of Search ................. 128/660; 73/599, 602; 342/195, 196, 197; 367/46, 190; 364/724

[56] References Cited

U.S. PATENT DOCUMENTS

| | | | |
|---|---|---|---|
| 4,481,646 | 11/1984 | Godard | 375/77 |
| 4,543,826 | 10/1985 | Ferrari | 128/660 |

*Primary Examiner*—Richard C. Pinkham
*Assistant Examiner*—Stuart W. Rose
*Attorney, Agent, or Firm*—Jack E. Haken

[57] ABSTRACT

An ultrasound attenuation scanner measures the local attenuation of tissues from pulse echo A-line data. An adaptive filter with a transfer function which is the inverse of the tissue undergoing examination operates on the complex envelope of the RF signal.

7 Claims, 7 Drawing Figures

METHOD AND APPARATUS FOR ESTIMATING THE ATTENUATION-VS-FREQUENCY SLOPE OF A PROPAGATION MEDIUM FROM THE COMPLEX ENVELOPE OF A SIGNAL

The invention relates to a method and apparatus for estimating the slope of the attenuation-vs.-frequency characteristics of a propagation medium from the values of a signal which has been propagated through the medium. The method and apparatus are particularly useful for the implementation of ultrasound attenuation scanners for the diagnostic imaging of human and animal tissues and body structures.

BACKGROUND OF THE INVENTION

Most echo ultrasound imaging apparatus of the prior art generates images of structures within a body wherein the brightness of individual pixels corresponds to the magnitude of local discontinuities in the acoustic impedance at corresponding points in the body.

A new class of ultrasound imaging equipment, which produces images of structures within a body wherein the brightness of pixels corresponds to a local value of ultrasound attenuation at a corresponding point in the body have recently been described. U.S. Pat. No. 4,389,892 to Johathan Ophir and Nabil Maklad is incorporated herein, by reference, as background material. That patent describes apparatus which utilizes differential measurements of echo intensities along A-lines to estimate local tissue attenuation. A raster scan is used to generate images from such A-line measurements. U.S. Pat. No. 4,515,163 to Flax et al also describes a method for determining local tissue attenuation from the positions of zero crossings in A-line signals.

It is possible to directly determine the slope of the attenuation vs. frequency characteristic of a propagation medium from samples of a signal which has propagated through that medium. However, in the context of an ultrasound attenuation scanner, that method requires that a radio frequency ultrasound signal, which has propagated through the medium, be sampled at a rate which is at least twice as high as its highest frequency component in order to avoid aliasing error. This requires high-speed sampling circuits which can significantly increase the cost and complexity of a scanner.

SUMMARY OF THE INVENTION

The present invention is a method for estimating the slope of the attenuation vs. frequency characteristic of a medium which operates directly on the complex envelope of a signal which has propagated through the medium. In an ultrasound attenuation scanner, the method and apparatus of the invention operate directly on the complex envelope of a radio frequency pulse-echo signal. The complex envelope can be sampled at a much lower rate than the RF signal without suffering from aliasing error. The signal processing circuitry of the scanner is thus significantly simplified.

In the absence of frequency dependent attenuation, the average frequency of the complex envelope of an ultrasound pulse which propagates through a medium is zero. The presence of frequency-dependent attenuation causes the average frequency of the complex envelope to shift away from zero. This variation is measured using an FM detector. The output of the detector is used as negative feedback to control the transfer function a compensating filter so that the filter drives the average frequency of the shifted complex envelope back to zero. The feedback signal thus sets parameters of the compensating filter. Those parameters are a measure of the attenuation parameters of the propagation medium. In a pulse echo system, the tissue characteristics change with depth and the parameters of compensating filter track them. The invention thus provides an system that continuously adapts itself to the properties of the medium undergoing measurement.

IN THE DRAWINGS

FIGS. 1a, 1b, and 1c illustrate the power spectra of signals;

DESCRIPTION OF A PREFERRED EMBODIMENT

Figure 1A:
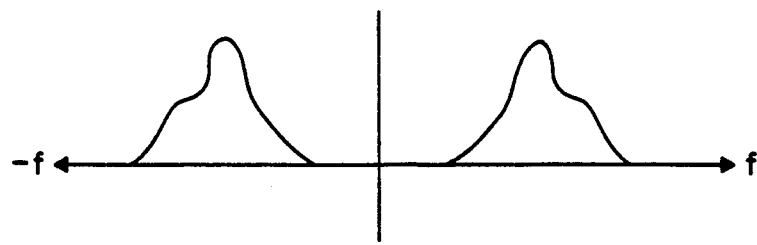

A real, stationary random signal, $v_i(t)$, propagates through a medium in which the attenuation is a function of frequency. The resulting output signal is $v_o(t)$.

If the medium is linear and time-invariant, then its effect on the signal can be described by a convolution in the form:

$$v_o(t) = \int dT\, g(t-T) v_i(T), \qquad (1)$$

where $g(t)$ is the impulse response of the medium. The transfer function of the medium is:

$$G(f) = \int dt\, e^{-2\pi i f t} g(t). \qquad (2)$$

The invention infers properties of the medium attenuation from signal processing operations on $v_i(t)$ and $v_o(t)$.

The complex analytic representation of the real signal, $v(t)$, is given by:

$$\gamma(t) = v(t) + iH\langle v(t)\rangle, \qquad (3)$$

where H denotes the Hilbert transform. In polar form this equation can be expressed as $$\gamma(t) = a(t) e^{i\theta(t)}. \qquad (4)$$

At a reference frequency, $f_o$, $$\phi(t) = \theta(t) - 2\pi f_o t, \qquad (5)$$

where $$\gamma(t) = a(t) e^{i\phi(t)} e^{2\pi i f_o t}. \qquad (6)$$

The complex envelope of the signal is defined as $$\psi(t) \triangleq a(t) e^{i\phi(t)}. \qquad (7)$$

If the reference frequency is chosen so that $$\omega_o = E\{\dot\theta(t)\}, \qquad (8)$$

then $$E\{\dot\phi(t)\} = 0.$$

Figure 1B:
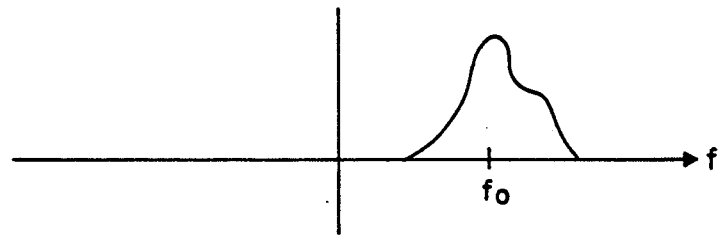
Figure 1C:
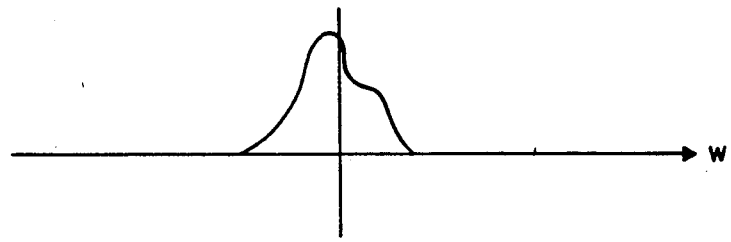

The relationship between these signals is illustrated in the drawings where FIG. 1a represents the power spectrum of a real signal FIG. 1b represents the power spectrum of the complex analytic representation of the signal of FIG. 1a, and FIG. 1c represents the power spectrum of the complex envelope of the signal of FIG. 1a.

Effect of the Medium on the Complex Envelope

Let $\gamma_i(t) = v_i(t) + iH\{v_i(t)\} = \psi_i(t)e^{2\pi if_0 t}$ (9)

Then $v_i(t) = Re\{\gamma_i(t)\}$, (10) and $$v_o(t) = \int dT\, g(t-T)\, v_i(T) \quad (11)$$

$$= \int dT\, g(t-T)\, Re\{\psi_i(T)e^{2\pi if_0 T}\}$$

$$= Re\{\int dT\, g(t-T)e^{-2\pi if_0(t-T)}\, i(T)e^{2if_0 t}\} \quad (12)$$

$$= Re\{\psi_o(t)e^{2\pi if_0 t}\} \quad$$

Where $$\psi_o(T) = \int dT\, g(t-T)e^{-2\pi if_0(t-T)}\psi_i(T) \quad (13)$$

or $\psi_o(T) = \int dT\, k(t-T)\psi_i(T)$ (14)

Where $k(t) = g(t)e^{-2\pi if_0 t}$ (15)

$K(f) = G(f+f_0)$ (16)

Compensating Filter

The effect of linear frequency dependence of attenuation on the complex envelope of a signal can be cancelled by a complex filter which filters the complex envelope.

If the transfer function of the medium is $G(f) = Ae^{-kf}, f > 0,$ (17)

then the transfer function of the compensating filter for the complex envelope has the form $H(f) = (1/A)e^{k(f+f_0)}, f > -f_0.$ (18)

Figure 2A:
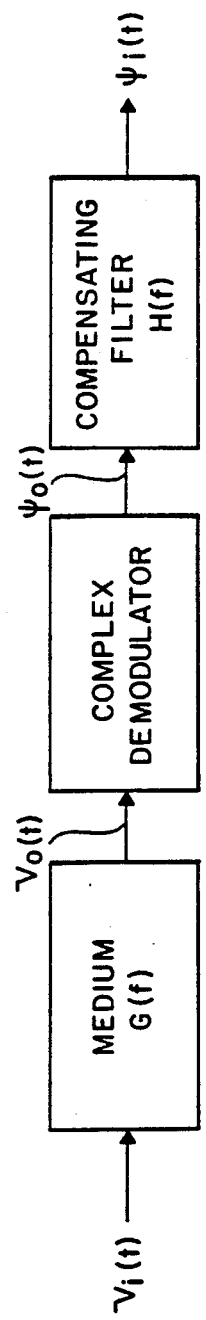
FIGS. 2a and 2b illustrate the principal of the compensating filter.

See FIG. 2a; or $H(f) = 1/G(f+f_0)$

Figure 2B:
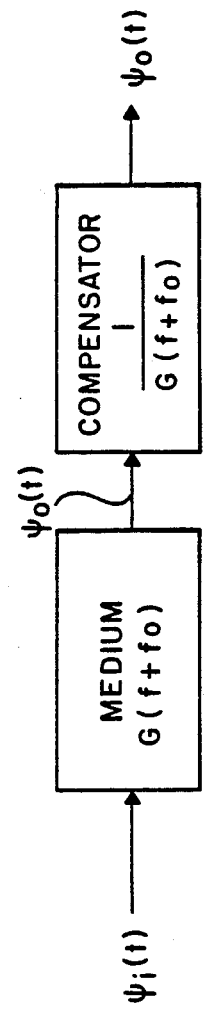

See FIG. 2b

A digital implementation of a compensating filter for the medium can be determined as follows:

$H(v) = e^{\bar{k}(v+v_0)}, -\tfrac{1}{2} < v < \tfrac{1}{2}$ (19)

Where $v_0 = f_0/f_s$ (20), $f_s$ = sample rate (21), and $\bar{k} = kf_s.$ (22)

Figure 3:
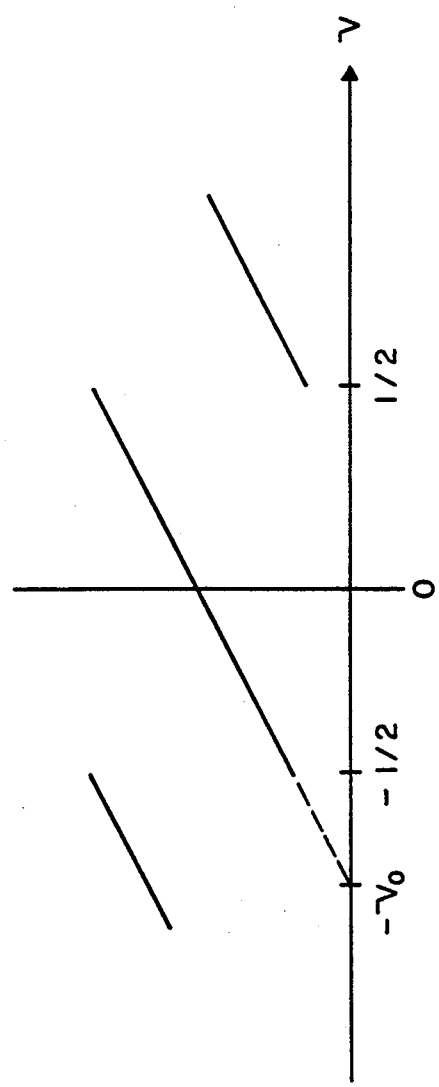
FIG. 3 illustrates digital filter design parameters.

The transfer function of the filter is illustrated in FIG. 3.

The complex impulse response of the filter is:

$$h(n) = \int_{-\frac{1}{2}}^{\frac{1}{2}} dv\, H(v)\, e^{2\pi inv} \quad (23)$$

$$h(n) = \int_{-\frac{1}{2}}^{\frac{1}{2}} dv\, e^{\bar{k}(v+v_0)}e^{2\pi inv} \quad (24)$$

$$h(n) = e^{\bar{k}v_0}\int_{-\frac{1}{2}}^{\frac{1}{2}} dv\, e^{(\bar{k}+2\pi in)v} \quad (25)$$

$$h(n) = \frac{e^{\bar{k}v_0}(-1)^n\, [e^{\bar{k}/2} - e^{-\bar{k}/2}]}{\bar{k} + 2\pi in} \quad (26)$$

$$h(n) = \frac{2(-1)^n\, e^{\bar{k}v_0}\, \mathrm{Sinh}(\bar{k}/2)}{\bar{k} + 2\pi in} \quad (27)$$

$$h(n) = \frac{2(-1)^n\, e^{\bar{k}v_0}\, \mathrm{Sinh}(\bar{k}/2)}{\bar{k}^2 + 4\pi^2 n^2}(\bar{k} - 2\pi in) \quad (28)$$

Figure 4:
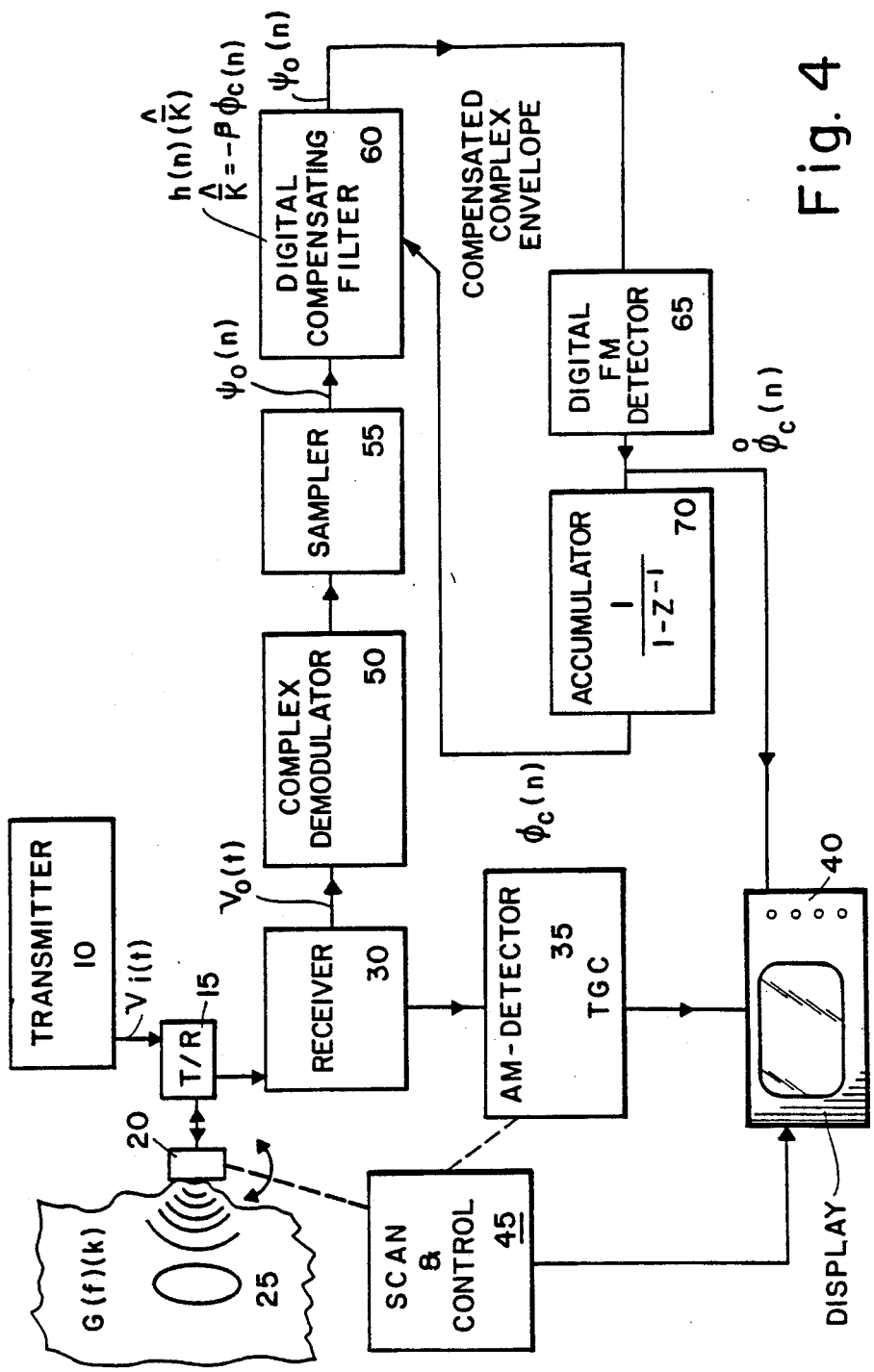
FIG. 4 is a block diagram of an ultrasound attenuation scanner which incorporates the present invention.

FIG. 4 illustrates an implementation of an attenuation scanner. Electrical pulses from an ultrasound pulse transmitter 10 are directed through a TR switch 15 to an ultrasound transducer 20. The transducer produces pulses of ultrasound energy which propagate into a body 25 where they produce echoes which are reflected back to the transducer. The echoes produce electrical signals in the transducer 20 which are again directed through the TR switch 15 to a receiver 30 where they are amplified in a conventional manner. The echo signals may be processed in a conventional AM detector-TGC circuit 35 to produce an image which is presented on a CRT display 40 in a conventional manner. The transmitter, detector, and display operate under the influence of a scanning and control circuit 45 which also electrically or mechanically scans the beam of ultrasound energy produced by the transducer over a sector of the body.

In accordance with the present invention the output signal $v_o(t)$ of the receiver 30 is also fed to a complex demodulator circuit 50 which, at its output, produces a signal which corresponds to the complex envelope of the received signal. Digital implementations of a complex demodulator are described, for example, in U.S. Pat. No. 4,481,646 to Godard and in "Theory and Implementation of the discrete Hilbert Transform", Gold et al in Digital Signal Processing, L. Rabiner, Ed; IEEE Press 1972. The output of the complex demodulator 50 is sampled, in a sampling circuit 55 to produce a signal $\psi_o(n)$. The sampling circuit 55 need only operate at a rate equal to twice the highest frequency component in the complex envelope. The output of the sampler 55 is fed to the input of a digital compensating filter, which is implemented in the manner described in the previous paragraphs. The output of the compensating filter, $\psi_i(n)$, represents the compensated complex envelope of the echo signal. If the digital compensating filter parameters are correctly chosen the compensated complex envelope will correspond to the complex envelope of the transmitted signal $v_i(t)$ and will have a zero average frequency. The compensated complex envelope signal is fed to a digital FM detector 65. The output of the digital FM detector, $\psi_i(n)$, corresponds to directly to the local value of the slope of the frequency dependent attenuation of the propagation medium 25. It may be applied directly to the display, for example to modulate the color of the display produced by the conventional AM detector 35.

The output of the digital FM detector 65 is also fed to the input of an accumulator circuit having a transfer function $1/(1-z^{-1})$. The output of the accumulator is then applied, as a negative feedback parameter, to control the characteristic $\bar{k}$, of the digital compensating filter 60. The filter 60, FM detector 65 and accumultor 70 thus function as a negative feedback loop which continually forces the average frequency of the output of the digital compensating filter to zero to maintain the filter characteristic as the inverse of the frequency dependent characteristic of the propagating medium 25.

What is claimed:

1. A method for measuring the attenuation characteristics of a propagation medium comprising the steps of:
    transmitting a pulse of energy into the medium;
    detecting, and producing an electrical signal which has a complex envelope from, echoes of said pulse which are reflected from points within said medium;
    extracting the complex envelope of said electrical signal;
    filtering the complex envelope using a complex filter with a controllable transfer function which can approximate the inverse of the transfer function of the propagation medium;
    measuring the average frequency of the filtered signal, the value of said average frequency being a representation of the value of the characteristic of the medium;
    integrating a plurality of values of the measured average frequency and applying said integrated values, as negative feedback to control the transfer function of the complex filter, whereby said transfer function is maintained as the inverse of the transfer function of the medium.

2. The method of claim 1 wherein the energy is radio frequency ultrasound energy and the characteristic of the medium is the local slope of the attenuation versus frequency curve in the propagation medium.

3. The method of claim 2 further comprising the step of displaying the value of the frequency deviation at pixels of an image whose coordinates are mapped to correspond to the locations of the reflecting points in the propagation medium.

4. The method of claim 2 or 3 wherein the propagation medium is animal tissue.

5. Apparatus for measuring the local slope of the ultrasound attenuation versus frequency curve at points in a body comprising:
    means for transmitting pulses of radio frequency ultrasound energy into a body, for detecting echoes of said pulses which are reflected from points within the body and for producing an RF electrical signal which represents said echoes and has a complex envelope;
    complex demodulator means which extract the complex envelope of the RF signal;
    complex compensating filter means, having a controllable transfer function which can approximate the inverse of the transfer function of the body, connected to filter the complex envelope;
    FM detector means connected to detect frequency deviations of the filtered complex envelope signals, said frequency deviations being a measure of the slope of said attenuation versus frequency curve;
    accumulator means for integrating said frequency deviations and for applying the integrated deviations as negative feedback to control the transfer function of the complex filter and maintain it as the inverse of the transfer function of the body.

6. An ultrasound attenuation scanner comprising:
    the apparatus of claim 5;
    display means connected to present pixels in a displayed image which represent the value of the frequency deviations of the complex envelope; and
    means which control the location of pixels in the displayed image to correspond with a mapping of the location of the associated reflecting points in the body.

7. The apparatus of claim 5 or 6 wherein the transfer function, $H(v)$, of the compensating filter means is:

$$H(v) = e^{\bar{k}(v+v_o)}, \quad -\tfrac{1}{2} < v < \tfrac{1}{2}$$

Where $$v_o = f_o/f_s,$$

$f_s$ = a sample rate,
$f_o$ = the nominal frequency of the RF signal,
$\bar{k} = kf_o$, and
$k$ is an attenuation constant of the medium.

* * * * *

UNITED STATES PATENT AND TRADEMARK OFFICE
CERTIFICATE OF CORRECTION

PATENT NO. : 4,676,250

DATED : June 30, 1987

INVENTOR(S) : CASPER W. BARNES

It is certified that error appears in the above-identified patent and that said Letters Patent is hereby corrected as shown below:

In the Claims:

Claim 7, line 3, "$H(v)=e^{\bar{k}(v+v)}, -\frac{1}{2} < v < \frac{1}{2}$" should be --$H(v)=e^{\bar{k}(v+v_0)}, -\frac{1}{2} < v < \frac{1}{2}$--.

Signed and Sealed this

Third Day of November, 1987

Attest:

Attesting Officer

DONALD J. QUIGG

Commissioner of Patents and Trademarks